Figure 1:
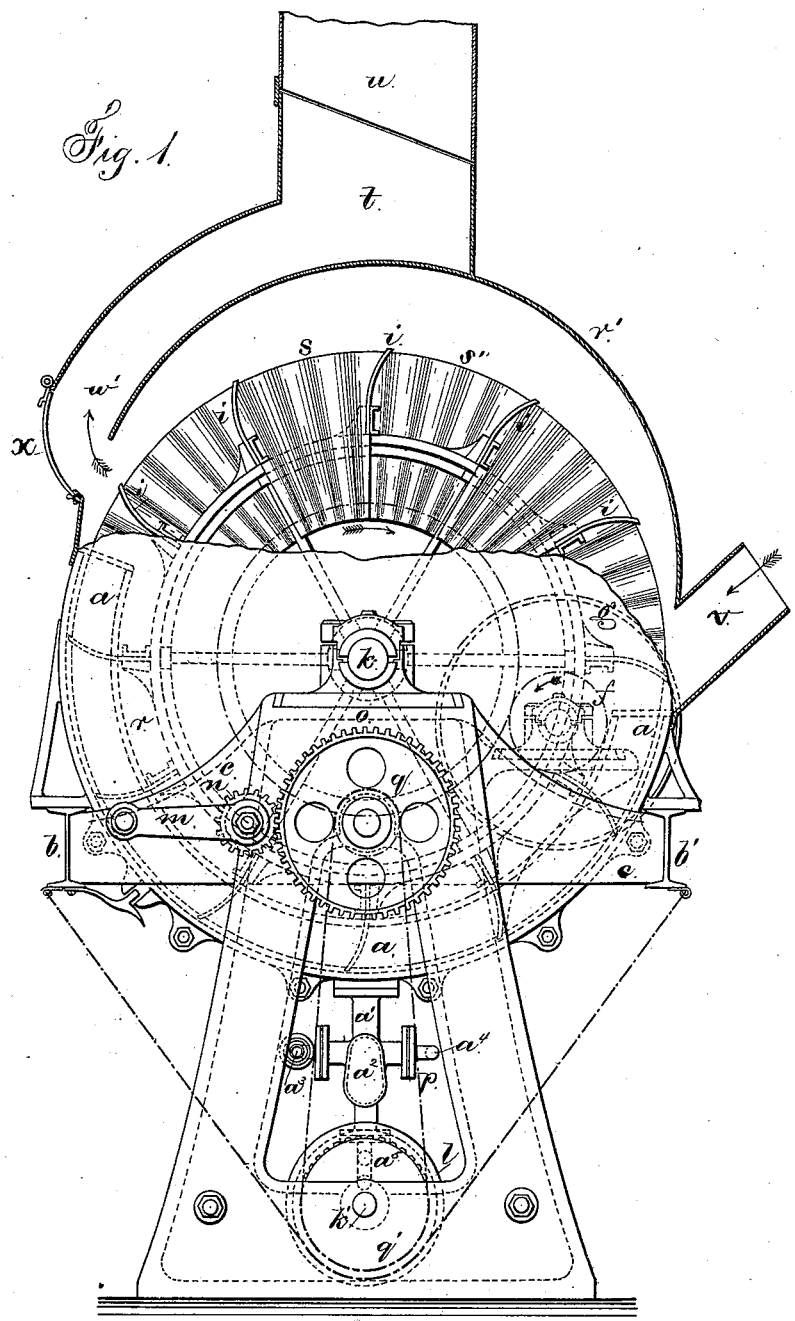

(No Model.) 10 Sheets—Sheet 1.

E. THEISEN.
EVAPORATING AND CONDENSING APPARATUS.

No. 332,848. Patented Dec. 22, 1885.

Witnesses:
J. Staib
Harold Serrell

Inventor:
Eduard Theisen
per Lemuel W. Serrell
Atty (No Model.) 10 Sheets—Sheet 2.
E. THEISEN.
EVAPORATING AND CONDENSING APPARATUS.
No. 332,848. Patented Dec. 22, 1885.
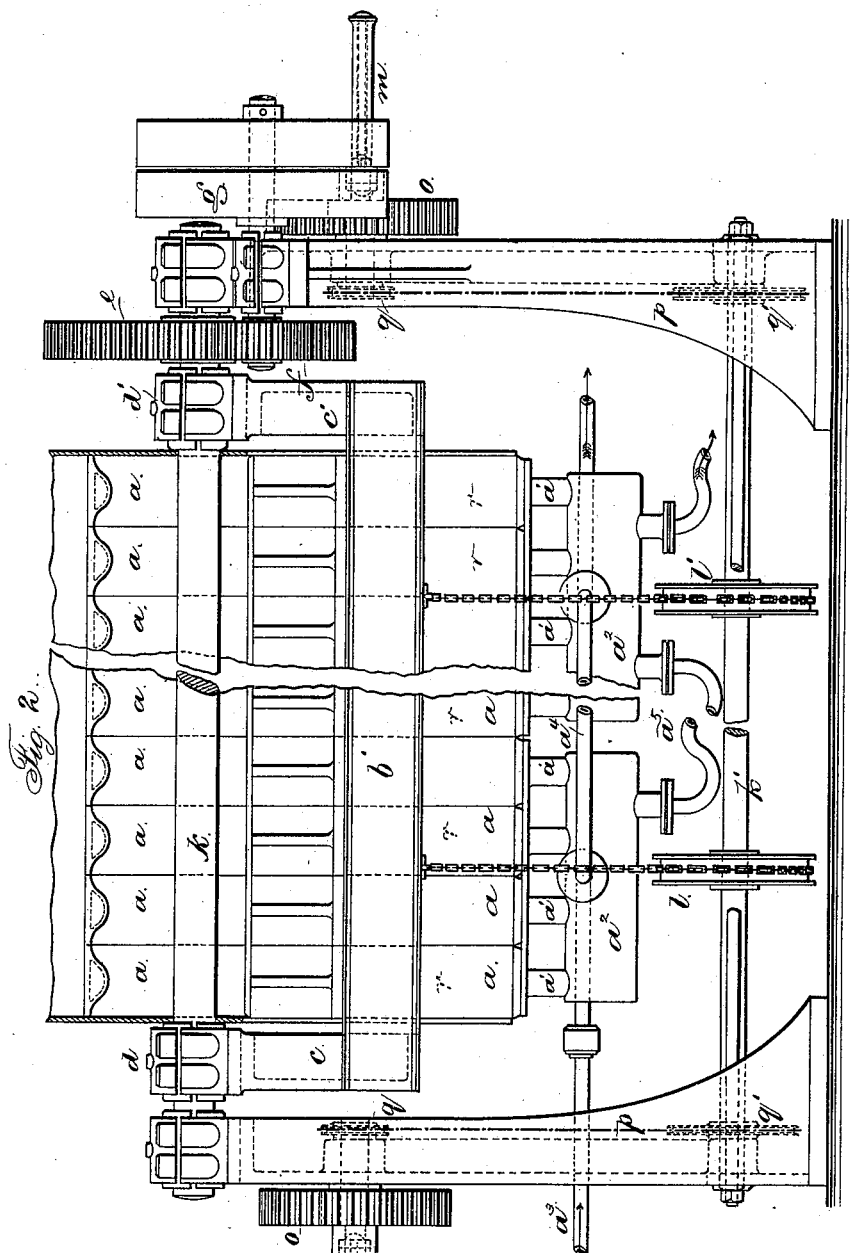
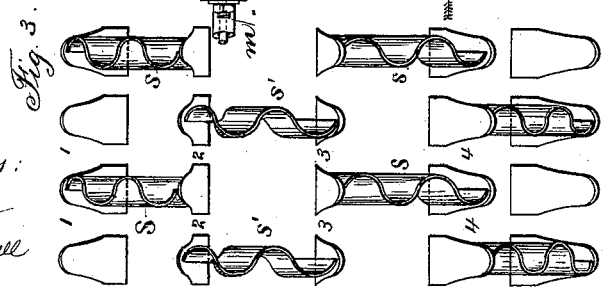
Witnesses:
J. Staib
Harold Serrell
Inventor
Eduard Theisen
per Lemuel W. Serrell
Atty.

(No Model.) 10 Sheets—Sheet 3.

E. THEISEN.
EVAPORATING AND CONDENSING APPARATUS.

No. 332,848. Patented Dec. 22, 1885.

Witnesses
Harold Serrell
J. Staib

Inventor
per Eduard Theisen
Lemuel W. Serrell
atty.

(No Model.) 10 Sheets—Sheet 4.
E. THEISEN.
EVAPORATING AND CONDENSING APPARATUS.

No. 332,848. Patented Dec. 22, 1885.

Witnesses
J. Staib
Harold Serrell

Inventor:
Eduard Theisen
per Lemuel W. Serrell
atty

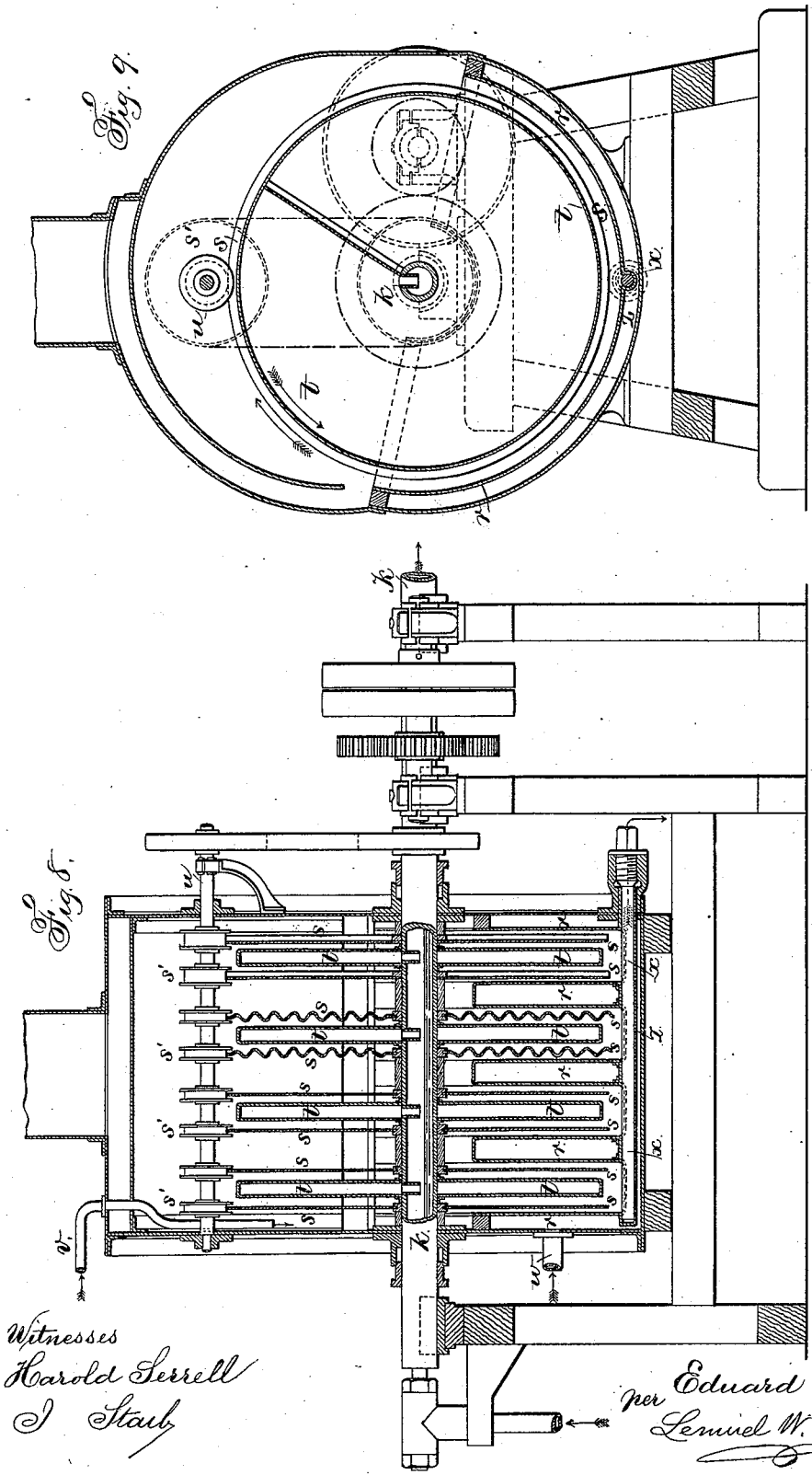

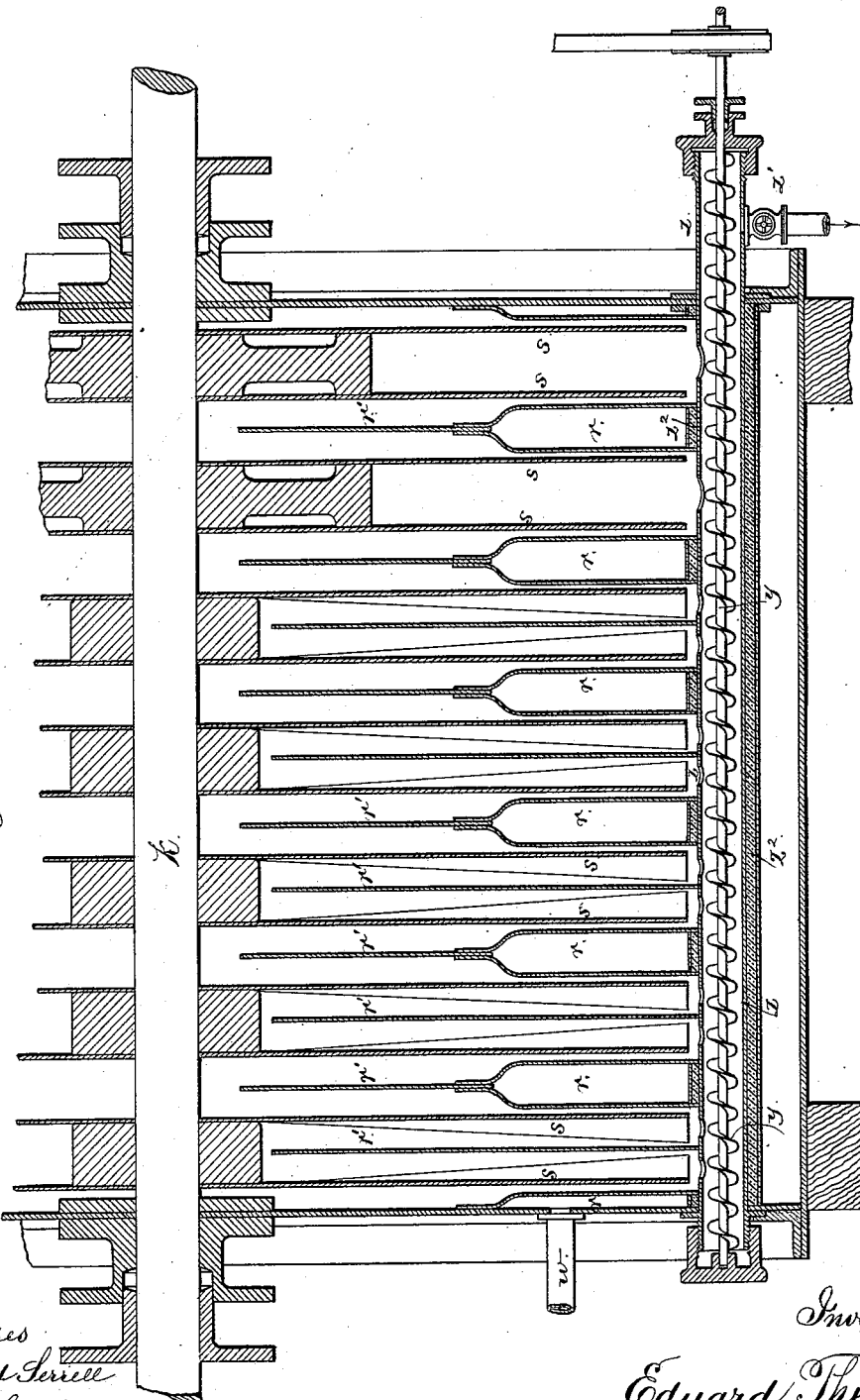

(No Model.) 10 Sheets—Sheet 7.
E. THEISEN.
EVAPORATING AND CONDENSING APPARATUS.
No. 332,848. Patented Dec. 22, 1885.
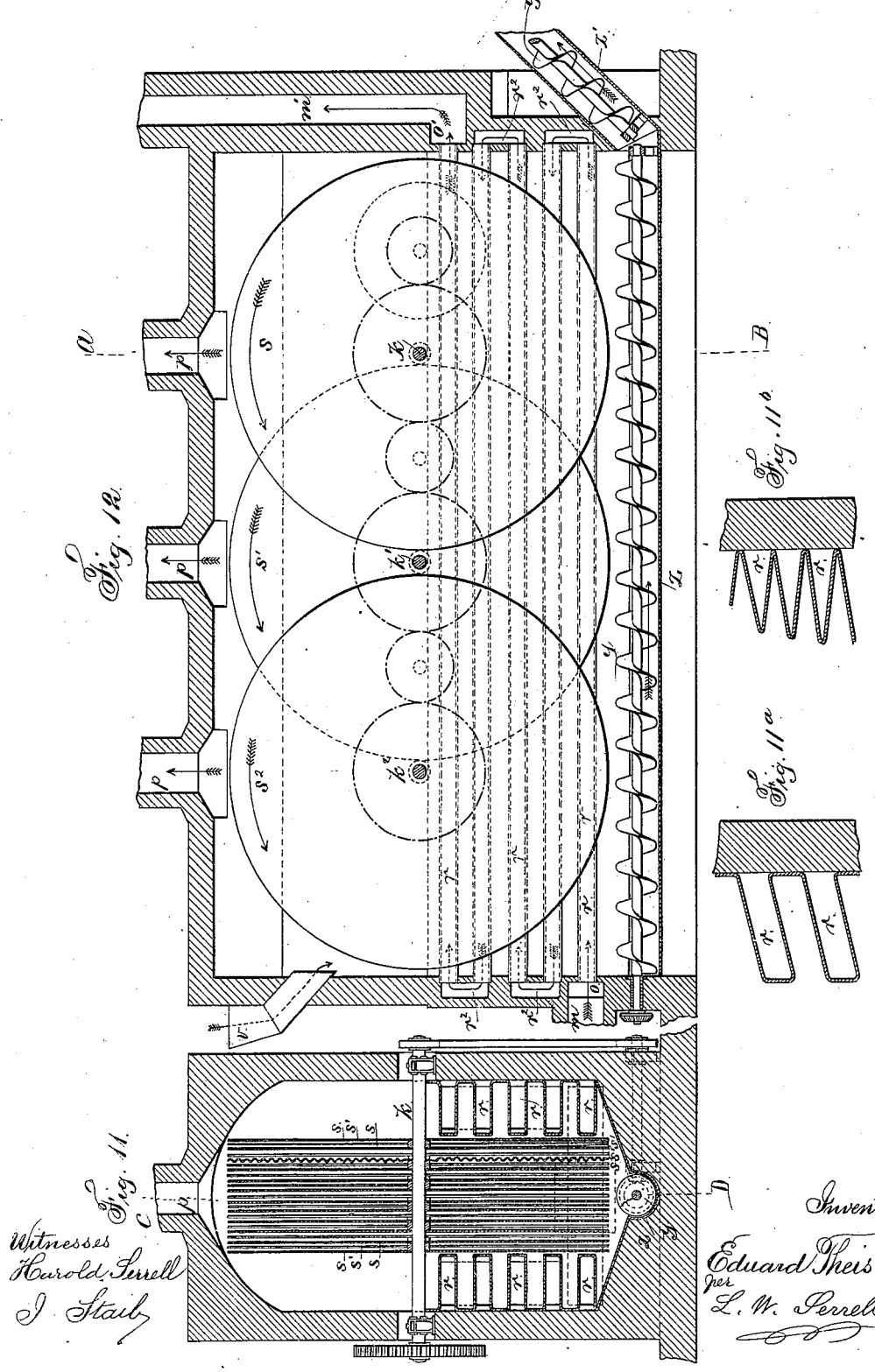
Witnesses
Harold Serrell
J. Staib
Inventor
Eduard Theisen
per
L. W. Serrell
Atty (No Model.) 10 Sheets—Sheet 8.
E. THEISEN.
EVAPORATING AND CONDENSING APPARATUS.
No. 332,848. Patented Dec. 22, 1885.
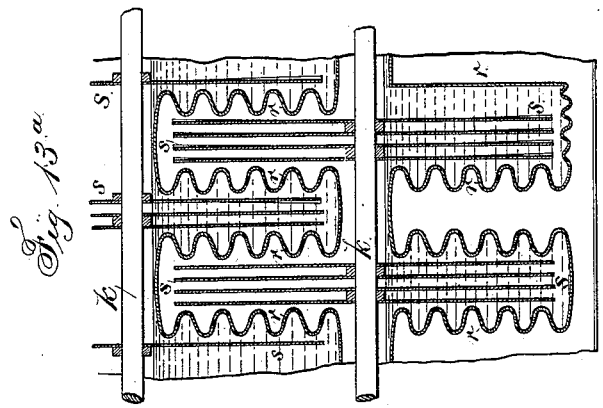
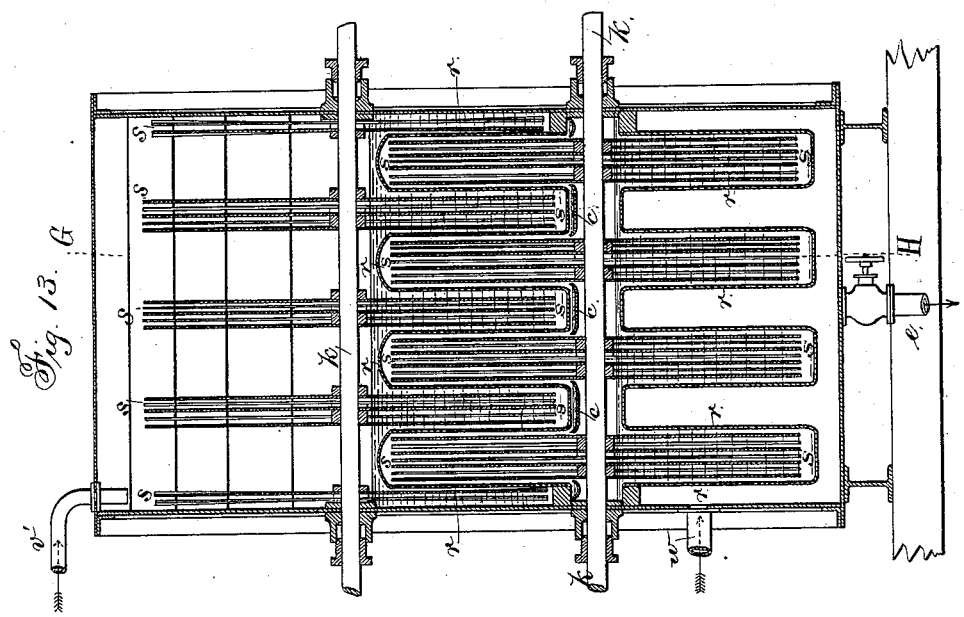
Witnesses
Harold Serrell
J. Stail
Inventor
per Eduard Theisen
Lemuel W. Serrell
atty (No Model.) 10 Sheets—Sheet 9.
E. THEISEN.
EVAPORATING AND CONDENSING APPARATUS.
No. 332,848. Patented Dec. 22, 1885.
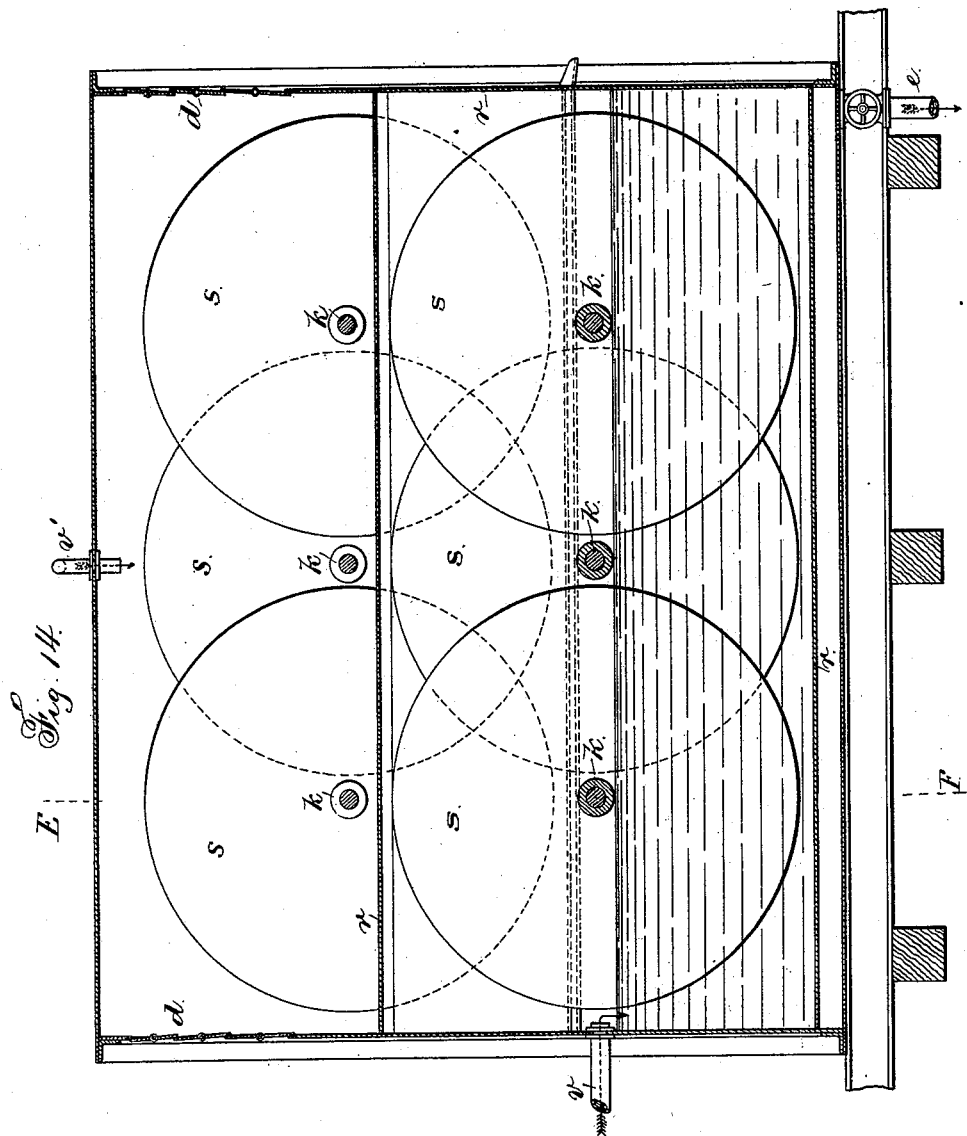
Witnesses
Harold Serrell
J. Stail
Inventor
Edward Theisen
per Lemuel W. Serrell
atty (No Model.) 10 Sheets—Sheet 10.
E. THEISEN.
EVAPORATING AND CONDENSING APPARATUS.

No. 332,848. Patented Dec. 22, 1885.

Witnesses
Harold Serrell
J. Staub

Inventor
per Eduard Theisen
Lemuel W. Serrell
Atty.

UNITED STATES PATENT OFFICE.

EDUARD THEISEN, OF LINDENAU, NEAR LEIPSIC, SAXONY, GERMANY.

EVAPORATING AND CONDENSING APPARATUS.

SPECIFICATION forming part of Letters Patent No. 332,848, dated December 22, 1885.

Application filed August 25, 1884. Serial No. 141,408. (No model.)

*To all whom it may concern:*

Be it known that I, EDUARD THEISEN, of Lindenau, near Leipsic, Saxony, in the Empire of Germany, have invented a new and useful Improvement in Evaporating or Condensing Apparatus; and the following is declared to be a description of the same.

The present invention relates to new and improved apparatus by the aid of which liquids and liquors of various kinds may be evaporated, condensed, and distilled with rapidity and economy. According to this invention the liquid or liquor to be treated is continuously exposed in numerous thin films or washes to the atmosphere or to the action of heat and cold, as may be desired. The apparatus consists of a trough or well shaped vessel having a corrugated or cellular bottom or sides, within which vessel a series of concentric rings, blades, or disks are mounted to rotate. These rings, blades, or disks may be plain, corrugated, or hollow, and means are provided for supplying a heating or cooling medium—such as steam or water—to the interior of the cellular bottoms and disks when such are employed.

The invention also relates to means for facilitating the withdrawal of the semi-liquid, or, it may be, crystalline products, resulting from the condensation or distillation of the liquid or liquor. The rotating disks may be combined with rings or blades, and may be divided or undivided. When the cellular bottoms or side walls of the apparatus are heated by steam, hot fluids, or gases, a large evaporating-surface is obtained, which is still further increased by means of the blades and disks rotating in the liquid contained in the vessel. These forms of apparatus are therefore specially suitable for the rapid and economical evaporation of large quantities of liquid, or, as the case may be, for the concentration of the same, or for obtaining crystals and solids therefrom. They are also well adapted to the condensation of steam by reason of the large evaporating-surface which they present, in combination with the large surfaces over or against which the fluid can be distributed.

Figure 16:
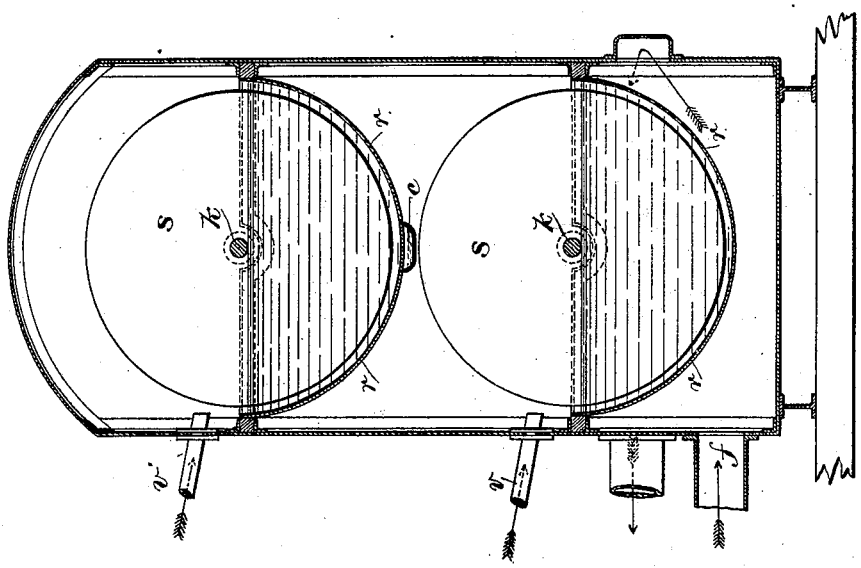
Figure 15:
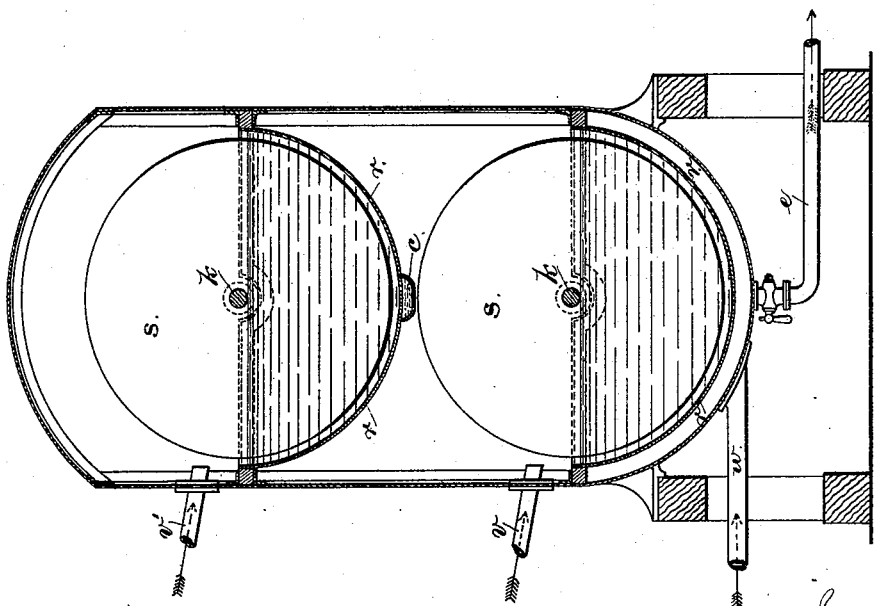

In the accompanying drawings, Figures 1 to 12, inclusive, and Fig. 16 show the apparatus with the combination above named for evaporating; and Figs. 13 to 15, inclusive, show the apparatus with similar combinations for the purpose of condensation.

In the evaporating apparatus represented in Figs. 1 and 2 the casing or container $r$ (which is formed of hollow semicircular pieces $a$ of corrugated form in longitudinal section) rests on the I-shaped girders or bearers $b\ b'$, which are held together at their extremities by means of the connecting-pieces $c\ c'$. These connecting-pieces are provided in their uppermost part with bearings $d\ d'$, by which they are hung upon the shaft $k$, which is set in motion by means of the spur-gearing $e\ f$ and band-pulley $g$. The shaft $k$ can thus be rotated together with the blades $i\ i$, while the corrugated casing $r$ hangs steadily upon it.

To tip the corrugated casing for the purpose of emptying the same when the evaporation is complete, chains connecting the bearers $b\ b'$ are led around chain-wheels $l\ l'$, fixed on a second shaft, $k'$. The shaft $k'$ can, by means of the crank $m$, spur-gearing $n\ o$, and endless chains $p$, adapted to the chain-wheel $q\ q'$, be made to revolve, thereby turning also the chain-wheels $l$ and the corrugated vessel or container $r$ on the shaft $k$, and when thus tilted or tipped the blades in their continuous motion scoop up the condensed fluid and throw it out of the said casing. The casing or trough may also be turned or tipped by adapting to one end of the corrugated periphery thereof a crown-wheel in gear with a spur-wheel, which will be driven in any convenient manner. The corrugated container $r$ may be closed with a cap or cover, $r'$, for the purpose of passing a current of air through the apparatus; and in this case a valve will be adapted at $x$, and the cap or cover will be provided with an extension-piece, $t$, cut off obliquely, the said extension-piece abutting against the chimney $u$, which is also cut off obliquely on its under side. The said cap or cover has also adapted to it, for the admission of air, a pipe, $v$, which, when the casing $r$ is to be tipped, will be disconnected. The cap $r'$ will then turn with the said casing, and the concentrated fluid can be removed by the blades $i$ out of the opening of the valve $x$. The chimney $u$ may also be widened sidewise, and connected by means of short tubes $t$. On the side opposite the chimney an opening of the full breadth of the apparatus (and capable of being closed when required) will allow of the free passage of a current of air through the upper half of the apparatus.

In order to bring the current of air passing through the apparatus in the direction of the arrows $w$ $w'$ into close contact with the liquid to be concentrated, thin plates $s$ $s'$ are adapted to and between the blades $i$, over which plates when revolving the fluid becomes distributed and is brought into contact with the air. These thin plates may either be flat or corrugated, as shown in Fig. 1, and in diagram view at Fig. 3. Instead of carrying these plates through the whole extent of the blades, it is advisable to allow gaps to intervene, so that the plates in one circle shall only extend from the blades 1 to 2 and from 3 to 4, in the next circle from 2 to 3 and from 4 to 5, and so on alternately. The stream of air finds a passage between these alternately-placed plates, and materially aids the concentrating process by carrying off the moist air.

It has been found advantageous in concentrating fluid or semi-fluid masses to so far concentrate the fluid or semi-fluid masses in the above-described evaporating apparatus that the same may be removed therefrom in the form of a thick paste or in a plastic condition, in order that they may be subsequently incorporated with dry or absorbent substances, and then to press the same by mechanical or other means, by which they will be brought into a pulverizable condition.

For leading the steam to the apparatus and carrying off the water of condensation therefrom, it is advantageous to provide each semicircular piece $a$ of the container at the lowest point with a short tube, $a'$, and to unite these short tubes in groups of, say, four, by means of a common reservoir or chamber, $a^2$. Steam will be led through $a^3$ into $a^2$, whence it will be distributed among the several hollow pieces $a$, and through the tube $a^4$ into the next reservoir or chamber $a^2$. In these reservoirs $a^2$ the water of condensation collects and is led off through the branch pipes $a^5$, and finally carried out of the apparatus. The pipes $a^4$ and $a^5$ are preferably bent to allow of a certain amount of expansion and contraction under the influence of hot steam and water.

Figure 4:
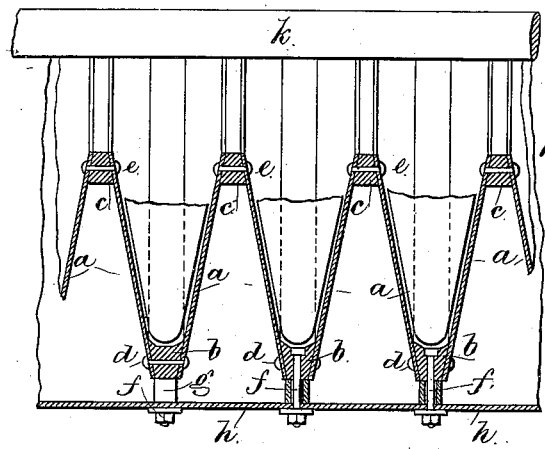
Figure 5:
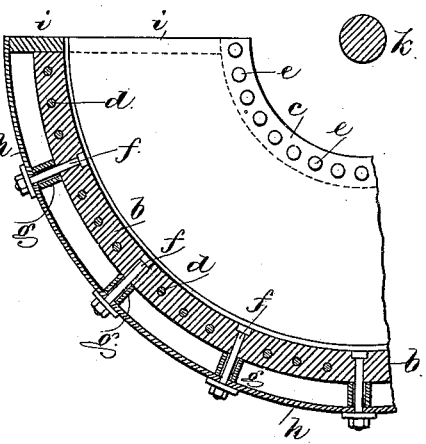

Instead of forming the vessel for containing the liquid out of hollow semicircular pieces of cast metal placed side by side, it may also be formed, as represented at Fig. 4, in longitudinal section, and at Fig. 5 in cross-section, out of single sheets of metal, or cast-iron plates held together by means of rings of special and suitable form.

$a$ are the plates, made of sheet metal or cast-iron of the breadth $x$, Fig. 5. The ring-segments $b$ form a circle of the same diameter as the plates. The ring-segments $b$ are tapered in cross-section, as are also the ring-segments $c$, and the width of these segments is such as to exactly fill the angles formed by the plates $a$ $a$. To these ring-segments $b$ and $c$ the plates are attached together by bolts and nuts $d$ $e$. The ring-segments $b$ are besides perforated in a radial direction for the reception of the screw-bolts $f$, which, together with the spacing-collars $g$, hold the outer plate, $h$, which forms a semi-cylindrical casing. By means of closing in end pieces, $i$, Fig. 5, which may be fitted in separately, or may be formed in one with the inner ring-segments, $c$, a heating-space is formed between the plates $a$ and the enveloping-plate $h$.

$k$ is the axis of the apparatus, on which are fixed the blades or disks which work in the vertical recesses or corrugations.

Figure 7:
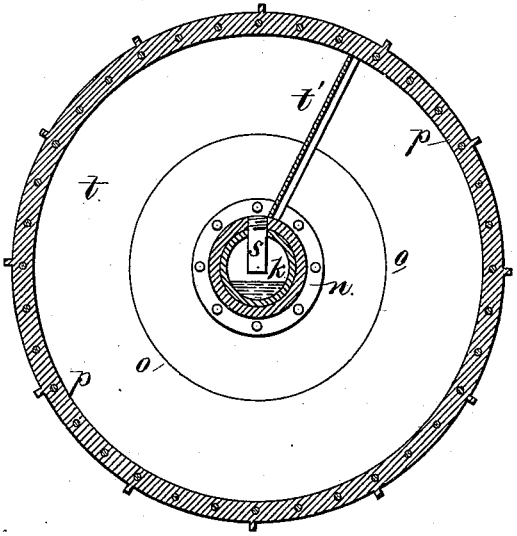
Figure 6:
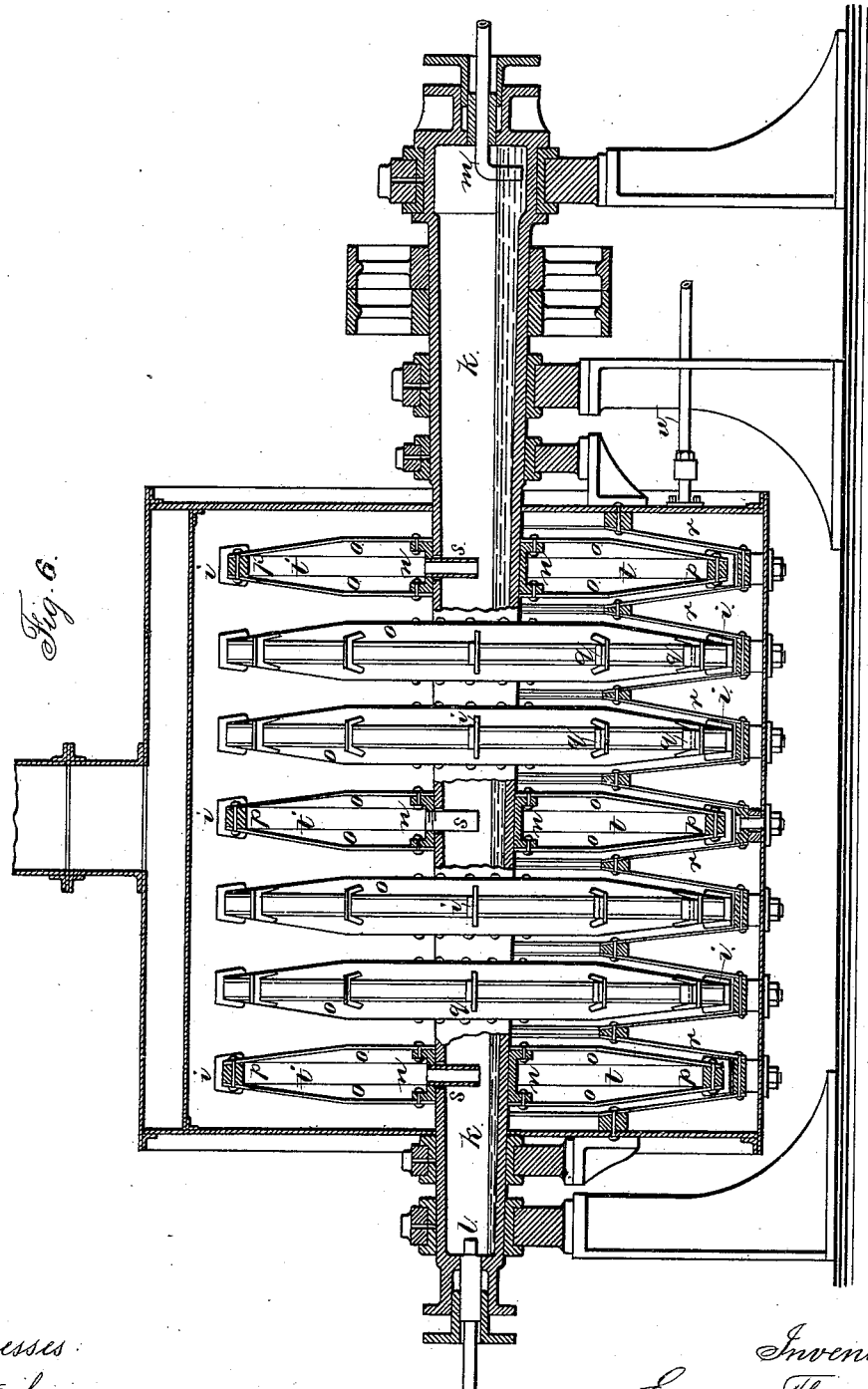

In the evaporating apparatus represented at Fig. 6 in longitudinal section the container $r$ is constructed in the manner shown at Figs. 4 and 5. The container $r$ will be heated externally by the steam entering at $w$, while in the interior of the said casing hollow heating-disks $t$ revolve. These hollow disks $t$, which are preferably made of sheet metal, are fixed to the hollow shaft $k$, which is provided at one end with a steam-inlet pipe, $l$, and at the other end with an outlet-pipe, $m$, for steam and water of condensation. The hollow disks $t$ are constructed in the same way as the recesses or cellular compartments of the container by bolting together metal plates and rings. The flanged rings $n$ are keyed on the shaft $k$, and the plates $o$ are bolted to these flanged rings and are closed in at their periphery by rings $p$. These rings may be provided at their periphery with projections $q$, on which blades $i$ are secured. The interior of each hollow disk $t$ communicates through the tube $s$ with the interior of the hollow shaft $k$. In each hollow disk $t$ a radial partition, $v'$, Fig. 7, is adapted, for the purpose of emptying away the water of condensation through the tube $s$ into the hollow space of the shaft when the disks are turned. The evaporation of the liquid by this employment of hollow heated disks and heated cellular containers or vessels is very considerably accelerated.

The hollow disks may be constructed in any other suitable manner, but it is necessary to keep in mind that means must be provided for removing the products of condensation therefrom in order that the efficiency of the heating-surfaces may be maintained.

In the evaporating apparatus represented at Fig. 8 in longitudinal section, and at Fig. 9 in cross-section, a hollow shaft, $k$, capable of rotating, is also provided, having inlets and outlets for steam or hot air. This shaft is also fitted with hollow disks $t$, into which the steam out of the hollow shaft enters, and from which the products of condensation, as shown at Figs. 6 and 7, flow back into the hollow shaft. The hollow disks $t$ rotate in the vertical recesses formed by the narrow semicircular chambers of the container $r$, which have vertical side walls, whereby the advantage is obtained that the fluid to be evaporated in the comparatively narrow space between two of the chambers $r\ r$ may be cut through by heated or unheated disks, and will be lifted up on thin "layers" into the evaporating-space above. Close along side each disk $t$ other disks, $s$, formed either of plain or corrugated sheet metal are loosely fitted onto the hollow shaft $k$. These disks $s$ receive rotary motion through contact with the friction-disks $s'$. The disks $s'$ are carried by the shaft $u$, which is drawn from outside the apparatus by means of driving-bands passing around the hollow shaft $k$, or in any other suitable manner. The disks $s'$ therefore impart to the disks $s$ an opposite direction of rotation to that of the hollow disk $t$. The fluid entering by the tube $v$ will therefore be lifted by the disks $s$ up and out of the vertical recesses between the hollow disks $t$ and the chambers $r\ r$ in thin strata, and be exposed still more to the influence of the steam present in the disks $t$. The curved bottom $r$ of the container will be heated by the steam entering at $w$. In order to draw off the concentrated fluid from out of the vertical compartments or chambers, the latter are slit transversely at their lowest point, and connected by a tube, $z$, common to all, which is so closed by a solid plug, $x$, corresponding in length to the length of the tube that no unconcentrated fluid can collect in the tube $z$. The plug $x$ is provided at its front end with a screw-thread adapted to engage with an internally-threaded socket fixed on the outside of the apparatus.

The apparatus is closed at top by means of a cap or cover, in the side of which is an exit-opening leading into the tube connected therewith, and (as in the apparatus shown in Figs. 1 and 2) on the side of the cap or cover opposite to this exit-opening a somewhat larger opening for the admission of air may be formed. The draft arising from these oppositely-situated openings will materially assist the evaporating action. The hollow shaft $k$ and the small shaft $u$, where they pass through the casing are fitted with stuffing-boxes.

The disks $s$, as indicated in the drawings, may either be plain or provided with parallel or radial corrugations. Further, in place of the plug $x$ in the tube $Z$ a tube formed with holes or cavities may be used, which for the purpose of emptying the apparatus will be turned so that its holes or cavities correspond with those in the vertical recesses.

A further modification of the evaporating apparatus is shown in longitudinal section at Fig. 10. In this case in place of the hollow shaft, there is a solid shaft, $k$, on which are keyed a number of naves or hubs, and to which are secured the disks $s$, which are either plain or furnished with radially-inclined fan-shaped corrugations. These disks $s$ rotate, as in the last-described apparatus, in the vertical recesses formed by the semicircular chambers $r$.

For the purpose of increasing the extent of the evaporating-surfaces, semicircular partitions $r'$ are adapted to and between the vertical chambers, so that the fluid to be evaporated, and which enters the same way as in Fig. 8, has a long distance to pass in going through the apparatus, and is thereby still further exposed to the influence of the steam entering through $w$ and passing circuitously through the cellular bottom $r$ of the container.

At the exit end of the apparatus, as seen in the drawings, only plain disks $s$ rotate, as the concentration of the fluid, when it reaches the last vertical recess, will have so far progressed that corrugated disks could only with great difficulty revolve.

In the exit-tube $z$, connecting the various vertical recesses, there is arranged a screw, $y$, capable of receiving rotary motion from outside the tube, which is closed at both ends, while outside the apparatus, on the under side of the tube $z$, a cock or valve, $z'$, is fitted. The screw $y$, which may be driven from the shaft $k$, through chains or bands, is of somewhat smaller diameter than the tube $z$, so that the not yet concentrated mass (which enters through the holes in the recesses of the tube $z$, and is continuously pressed forward by the screw toward the exit end) will be compelled through the closing of the cock $z'$ to re-enter the tube $z$, until after being tested (by sampling) it is finally drawn off through the opening of the valve $z'$.

In order to protect the mass collected in the tube $z$ against overheating by the steam, and also to protect the screw from sticking fast, the tube $z$ is surrounded with a packing, $z^2$, of non-conducting material, which may also be surrounded with a metal casing.

In the evaporating apparatus shown at Fig. 11, in cross-section on the line A B, and at Fig. 12, in longitudinal section on the line C D, the chambers $r\ r$, which form part of the container, instead of being placed vertically, are placed horizontally. They can, however, if desired, also be inclined, as shown at Fig. 11$^a$, or even arranged at an acute angle, as in Fig. 11$^b$. The apparatus receives in this way, instead of a hollow or cellular semicircular bottom, hollow or cellular sides, which at their under portion again unite to the exit-tube $z$, which extends over the entire length of the apparatus. These cellular sides are closed in by masonry, on their longitudinal as well as their front portions, so that at both sides of the apparatus the longitudinal channels $r$ will be formed, of which the two lowermost are connected together by means of a cross-channel $o$, into which latter a hot-air-conducting-channel, $m$, opens. The separate channels $r$ are connected together alternately on each side by channels $r^2$, while the uppermost of the two channels $r$ on each side are also connected together by a cross-channel, $o'$, which is in connection with a chimney, $m'$, so that the hot air entering through $m$ and arriving in the channels $r$ through the cross-channels must follow the helical course indicated by the arrows in Fig. 12 in its passage through the hollow sides, and thus giving off its heat to the latter, passes away through the cross-channel $o'$ into the chimney $m'$. The fluid to be evaporated enters through $r$ into the space formed by the cellular or corrugated sides, and a large number of plain or corrugated disks, fitted onto a rotating shaft, dip therein, as in the previous arrangements, and in this case there will be (according to the size of the apparatus) several rotating shafts fitted with disks, the said shafts being arranged horizontally and close together in the side masonry.

In Fig. 12 three shafts, $k$, $k'$, and $k^2$, fitted into plain or corrugated disks $s$, $s'$, and $s^2$, are so arranged that the disks $s'$ on the shaft $k'$ will overlap and alternate with the disks $s$ and $s^2$, fitted on the shafts $k$ and $k^2$, so that the disks $s'$ rotate between the disks $s$ and $s^2$. The shafts, together with the disks, can be set in rotation by means of belt-pulleys, chain-wheels, or other gearing. The portions of the mass of material remaining in the curved or concave recesses of the cellular sides of the apparatus will be carried forward by the current produced by the rotating disks. This effect, however, will take place more readily (especially in the case of the separation of crystals from the fluid to be evaporated) when making use of the inclined or the acute-angled arrangement of corrugations, as shown at Figs. 11$^a$ and 11$^b$.

For drawing off the concentrated mass or separated crystals, a screw, $y$, is arranged within the horizontal tube $z$, the screw being set in rotation from outside the apparatus.

For the purpose of closing the tube $z$ against the escape of unconcentrated material, a tube, $z'$, is fitted thereon, the same being inclined upward, and reaching to a height corresponding to that at which the tube is closed, and in which there is also a worm, $y'$, receiving rotary motion from one of the shafts $k$, and through which the material, after the concentration is completed, will be led out of the apparatus. Through the channels $p$ the vapors arising or generated in the apparatus are drawn off or allowed to escape.

A further modification of the evaporating apparatus is represented at Fig. 13 in cross-section on the line G H, and at Fig. 14 in longitudinal section on the line E F. In this arrangement the cellular bottom $i$ is duplicated, the parts lying one above another, and the container is of rectangular instead of semicircular form. In the corrugated recesses of these two containers rotate also a number of plain or corrugated disks, $s$, fitted into shafts $k$, arranged near to one another. The two containers $r$ are so arranged one above another that the disks which dip into the corrugated recesses of the undermost container will rotate between the corrugated side surfaces of the upper container or vessel. The lower container $r$ will be filled through the opening $v$ with the fluid to be evaporated up to about the level of the shaft $k$, while the upper container or vessel $r$ will be filled through $v'$ with cold water. By means of the steam entering at $w$ and playing round the under sides of the lower container the fluid, which is being continually lifted up in thin strata out of the corrugated recesses of the lowermost container by means of the disks $s$, will be quickly vaporized, which vapor becomes rapidly condensed on the outside surfaces of the uppermost vessel by means of the water kept in constant circulation in the corrugated recesses of the latter by the rotation of another set of disks, $s$. The condensed material can either flow back again for evaporation into the corrugations or be led out of the apparatus by means of the gutters $c$, placed beneath the corrugations.

The front or side walls of the apparatus may, for the purpose of admitting a current of cold air, be constructed at their upper parts with damper-boards, as shown at $d\,d$, Fig. 14. These apparatus may also be employed in the form represented, and as already mentioned in the description, as condensers for the waste steam of steam-engines, &c., in which case the lower container also will be filled with plain water.

Instead of constructing the containers with flat-surfaced compartments, the same may be provided with horizontally or vertically corrugated compartments, as represented at Fig. 13$^a$.

In the forms of evaporating apparatus represented in cross-section at Figs. 15 and 16 the containers $r$, arranged one above another, are semicircular, and a number of straight or corrugated disks, $s$, rotate within their cellular or corrugated compartments, as already described with reference to Figs. 1 to 10. The lower container (shown in Fig. 15) is heated by the steam entering at $w$, while the same in Fig. 16 will be played upon by a current of hot air entering through $f$, when the apparatus is to be employed for evaporating.

$v$ and $v'$ are the tubes of admission, and $c$ the gutters for carrying off the condensed or thickened material under treatment.

In this arrangement, as well as in those previously described, the troughs or vessels may be composed of plain sheets or plates of metal, or of sheets or plates of metal with concentric parallel or radial corrugations, in order to increase the influence of the steam or of the hot air when evaporating, or of the water when condensing. Further, the containers in Figs. 13 to 16 can also be arranged in more than a double tier, one above the other, so that by means of steam, which is admitted under the lowermost container, one is enabled to obtain from a single source of heat a rapid and economical series of evaporations in the several separate containers, and can thus obtain a large quantity of distilled water in an economical manner. The corrugated or cellular containers in Figs. 15 and 16 can also be so arranged, one above another, that the disks rotating in the lowermost container will rotate between the sides of the overlying container, forming curved or concave recesses. It will be self-evident that in this case the gutters for carrying off the condensed matters must be arranged crosswise under each of the concave recesses.

Having now particularly described and ascertained the nature of my said invention and in what manner the same is to be performed, I claim—

1. The combination, in an evaporating apparatus, with the revolving shaft and the circular blades or disks upon the same for exposing the liquid material to be evaporated, of a vessel to contain said liquid, having portions of the sheet metal thereof extending inwardly to form flues or channels for the external heat and to increase the area upon which the heat acts to evaporate the material, substantially as specified.

2. The combination, in an evaporating apparatus, with the revolving shaft and the circular blades or disks upon the same for exposing the liquid material to be evaporated, of a vessel to contain said liquid, having portions of the sheet metal thereof extending inwardly to form flues or channels for the external heat, and corrugated to increase the area upon which the heat acts to evaporate the material, substantially as specified.

3. In an evaporating apparatus, the combination, with vessels or containers for the reception of the liquid to be evaporated, of circular revolving blades or disks, said blades or disks being corrugated to expose a greater surface to evaporation, substantially as specified.

In testimony whereof I have hereunto set my hand, this 11th day of January, 1884, in the presence of two subscribing witnesses.

EDUARD THEISEN.

Witnesses:
 WILHELM WOLSENHÜTTER,
 MARTIN KÖRNER.